(12) United States Patent
Lynam et al.

(10) Patent No.: US 7,035,678 B2
(45) Date of Patent: Apr. 25, 2006

(54) MODULAR REARVIEW MIRROR ASSEMBLY INCLUDING AN ELECTRONIC CONTROL MODULE

(75) Inventors: Niall R. Lynam, Holland, MI (US); Desmond J. O'Farrell, Holland, MI (US); Roger L. Veldman, Holland, MI (US)

(73) Assignee: Donnelly Corporation, Holland, MI (US)

( * ) Notice: Subject to any disclaimer, the term of this patent is extended or adjusted under 35 U.S.C. 154(b) by 775 days.

(21) Appl. No.: 09/835,661

(22) Filed: Apr. 16, 2001

(65) Prior Publication Data

US 2001/0015862 A1    Aug. 23, 2001

Related U.S. Application Data

(60) Division of application No. 09/477,539, filed on Jan. 4, 2000, now Pat. No. 6,217,181, which is a division of application No. 08/702,228, filed on Aug. 23, 1996, now Pat. No. 6,019,475, which is a continuation-in-part of application No. 08/316,047, filed on Sep. 30, 1994, now Pat. No. 5,659,423.

(51) Int. Cl.
*G02B 5/08*    (2006.01)
*G02B 7/182*    (2006.01)

(52) U.S. Cl. .............................. 455/575.1; 455/575.8; 455/347; 359/614; 359/839; 359/871

(58) Field of Classification Search ............... 455/566, 455/345, 347, 575.9, 575.1, 575.8; 359/601–614, 359/839, 871
See application file for complete search history.

(56) References Cited

U.S. PATENT DOCUMENTS

| 2,161,777 A | 6/1939 | Sarnes ........................... 250/33 |
| 2,528,590 A | 11/1950 | Garlow ........................... 88/85 |
| 2,586,643 A | 2/1952 | Garlow ......................... 177/329 |
| 2,836,818 A | 5/1958 | DeVirgilis ................... 343/720 |
| 2,964,746 A | 12/1960 | Trudnak, Jr. et al. ........ 343/713 |

(Continued)

FOREIGN PATENT DOCUMENTS

EP    0381016    8/1990

(Continued)

*Primary Examiner*—Joseph Feild
*Assistant Examiner*—S. Smith
(74) *Attorney, Agent, or Firm*—Van Dyke, Gardner, Linn & Burkhart, LLP

(57) ABSTRACT

A modular rearview mirror assembly for vehicles incorporates a housing into the mirror assembly case for supporting an electronic control module to reduce the vibration, to ease the installation of the components in the mirror assembly, and to improve access to the various components in the mirror assembly for maintenance or repair. The rearview mirror assembly includes a reflective element, at least one electrical component mounted to the reflective element, and a case housing the reflective element and the electrical component. An electronic control module is supported by the case which communicates with the electrical component. Preferably, the electronic control module is supported by a housing that is either molded with the case or welded to the inner surface of the case to support the electronic control module independently from the electrical component.

30 Claims, 6 Drawing Sheets

U.S. PATENT DOCUMENTS

| | | | |
|---|---|---|---|
| 3,090,960 A | 5/1963 | Ingledew | 343/906 |
| 3,099,797 A | 7/1963 | Piccinini | 325/312 |
| 3,188,641 A | 6/1965 | Gergely | 343/715 |
| 3,722,984 A | 3/1973 | Brean | 359/605 |
| 3,939,423 A | 2/1976 | Zakharov et al. | 325/312 |
| 4,210,357 A | 7/1980 | Adachi | 296/84 |
| 4,632,509 A | 12/1986 | Ohmi et al. | 350/283 |
| 4,671,617 A | 6/1987 | Hara | 359/602 |
| 4,676,601 A | 6/1987 | Itoh et al. | 350/331 |
| 4,712,879 A | 12/1987 | Lynam et al. | 350/357 |
| 4,721,364 A | 1/1988 | Itoh et al. | 359/602 |
| 4,760,394 A | 7/1988 | Takeuchi et al. | 340/825.54 |
| 4,868,915 A | 9/1989 | Takeuchi et al. | 340/825.31 |
| 4,873,530 A | 10/1989 | Takeuchi et al. | 343/711 |
| 4,925,289 A | 5/1990 | Cleghorn et al. | 359/877 |
| 4,986,646 A | 1/1991 | Hamamoto et al. | 359/877 |
| 4,988,179 A | 1/1991 | Stensland | 359/877 |
| 4,988,858 A | 1/1991 | Pinson | 359/857 |
| 5,012,593 A | 5/1991 | Okada et al. | 34/69 |
| 5,140,455 A | 8/1992 | Varaprasad et al. | 359/275 |
| 5,151,824 A | 9/1992 | O'Farrell | 359/604 |
| 5,170,288 A | 12/1992 | Imaizumi et al. | 359/507 |
| 5,196,965 A | 3/1993 | Lang et al. | 359/841 |
| 5,207,492 A | 5/1993 | Roberts | 362/30 |
| 5,223,814 A | 6/1993 | Suman | 340/525 |
| 5,245,480 A | 9/1993 | Polzer | 359/877 |
| 5,268,795 A | 12/1993 | Usami | 359/872 |
| 5,322,996 A | 6/1994 | Black et al. | 250/214 |
| 5,371,659 A | 12/1994 | Pastrick et al. | 362/83.1 |
| 5,397,888 A | 3/1995 | Muramatsu | 250/205 |
| 5,402,134 A | 3/1995 | Miller et al. | 343/742 |
| 5,442,340 A | 8/1995 | Dykema | 340/825.22 |
| 5,446,576 A | 8/1995 | Lynam et al. | 359/267 |
| 5,475,366 A | 12/1995 | Van Lente et al. | 340/525 |
| 5,475,395 A | 12/1995 | Nakamura et al. | 343/720 |
| 5,479,155 A | 12/1995 | Zeinstra et al. | 340/825.22 |
| 5,497,305 A | 3/1996 | Pastrick et al. | 362/83.1 |
| 5,504,478 A | 4/1996 | Knapp | 340/825.69 |
| 5,535,056 A | 7/1996 | Caskey et al. | 359/603 |
| 5,659,423 A | 8/1997 | Schierbeek et al. | 359/604 |
| 5,691,849 A | 11/1997 | Ledroit et al. | 359/871 |
| 5,715,093 A | 2/1998 | Schierbeek et al. | 359/601 |
| 5,786,772 A | 7/1998 | Schofield et al. | 340/903 |
| 5,798,575 A | 8/1998 | O'Farrell et al. | 307/10.1 |
| 5,798,882 A * | 8/1998 | Lang | 359/872 |
| 5,971,552 A | 10/1999 | Veldman et al. | |
| 6,019,475 A * | 2/2000 | Lynam et al. | 359/879 |
| 6,217,181 B1 * | 4/2001 | Lynam et al. | 359/879 |

FOREIGN PATENT DOCUMENTS

| | | |
|---|---|---|
| GB | 2004237 | 3/1979 |
| GB | 2105847 | 3/1983 |
| GB | 2292857 | 3/1996 |
| GB | 2297632 | 8/1996 |
| JP | 60173922 | 11/1985 |

\* cited by examiner

MODULAR REARVIEW MIRROR ASSEMBLY INCLUDING AN ELECTRONIC CONTROL MODULE

This application is a divisional application of application Ser. No. 09/477,539, filed Jan. 4, 2000, now U.S. Pat. No. 6,217,181, by Niall R. Lynam, Desmond J. O'Farrell, and Roger L. Veldman, entitled MODULAR REAR VIEW MIRROR ASSEMBLY INCLUDING AN ELECTRONIC CONTROL MODULE, which is a divisional application of application Ser. No. 08/702,228, filed on Aug. 23, 1996, by Niall R. Lynam, Desmond J. O'Farrell, and Roger L. Veldman, entitled MODULAR REAR VIEW MIRROR ASSEMBLY INCLUDING AN ELECTRONIC CONTROL MODULE, now U.S. Pat. No. 6,019,475, which is a continuation-in-part of application Ser. No. 08/316,047 entitled MODULAR VARIABLE REFLECTANCE MIRROR ASSEMBLY and filed on Sep. 30, 1994, now U.S. Pat. No. 5,659,423.

TECHNICAL FIELD AND BACKGROUND OF THE INVENTION

This invention relates to an improved modular exterior rearview mirror assembly incorporating an electronic control module. More particularly, the present invention relates to the mounting of the electronic control module within the exterior rearview mirror assembly housing.

Conventional exterior rearview assemblies include a mirror housing and a reflective element supported in the housing by a mirror actuator for engaging the reflective element for adjusting the reflective element's orientation. Typically, the mirror actuator is controlled either manually by a lever inside the vehicle or electrically by a switch inside the vehicle. In recent developments, mirror assemblies may include mirror actuators responsive to memory devices that store multiple positions for the mirror assembly's reflective element, such as disclosed in U.S. Pat. No. 5,196,965 to Lang et al. entitled REAR VIEW UNIT FOR MOTOR-VEHICLES, which is incorporated by reference herein. Furthermore, mirror assemblies may include: Electro-optic reflective elements, which adjust the reflectance level of the reflective element; remote-actuated exterior vehicle security lights and signal lights, such as disclosed in commonly assigned U.S. Pat. Nos. 5,371,659 and 5,497,305 for REMOTE ACTUATED EXTERIOR VEHICLE SECURITY LIGHT; Global Positioning System antennas or receivers, as disclosed in patent application Ser. No. 08/569,851 filed Dec. 8, 1995, by Roger L. Veldman and Desmond J. Farrell for a VEHICLE GLOBAL POSITIONING SYSTEM NAVIGATION AID; heaters to remove ice from the reflective element, such as disclosed in U.S. patent application Ser. No. 07/971,676, filed Nov. 4, 1992, by Niall R. Lynam et al. for AN ELECTROCHROMIC MIRROR FOR VEHICLES, now U.S. Pat. No. 5,446,576; and blind spot detection systems, such as disclosed in U.S. patent application Ser. No. 60/013,941 filed Mar. 22, 1996, by Kenneth (NMI) Schofield for PROXIMITY DETECTION OF OBJECTS IN AND AROUND A VEHICLE, now U.S. Pat. No. 5,786,772, the disclosures of which are hereby incorporated herein by reference. Various other devices housed in an exterior mirror assembly include heading sensors, intrusion detectors, variable reflectance control systems for electrochromic mirror operation, transmitting and/or receiving antennas, such as antennas for global positioning systems (GPS) and intelligent vehicle highway systems (IVHS), garage door opener transmitters and antennas, cellular telephone transmitters and antennas, and the like are candidates for positioning within a mirror assembly. For example, an electronically trainable garage door opener may be included, such as is described in U.S. Pat. No. 5,479,155 issued to Zeinstra et al.

The increase in electronic functions being performed through the vehicle rearview assembly increasingly involves communication with other portions of the vehicle. For example, global positioning system (GPS) functions and intelligent vehicle highway system (IVHS) functions may interact with other modules controlling vehicle navigation and the like. A headlamp control of the type disclosed in commonly assigned U.S. patent application Ser. No. 08/277,674 filed Jul. 19, 1994, by Kenneth L. Schierbeek and Niall R. Lynam, for an AUTOMATIC REARVIEW MIRROR SYSTEM WITH AUTOMATIC HEADLIGHT ACTIVATION, now U.S. Pat. No. 5,715,093, the disclosure of which is hereby incorporated herein by reference, utilizes common light sensors for activating the vehicle's headlights and establishing a partial reflectance level for an electro-optic mirror element. Such features may require interaction between the mirror assembly and a headlamp module.

The vehicular exterior mirror assembly has become sophisticated resulting in a more complicated assembly having a plurality of electrical components and electronic controls. Frequently, the electrical components and electronic controls are separately installed and, quite often, commonly mounted to the reflective element. This is especially common where an electrical function associated with the reflective element is performed. For example, in patent application Ser. No. 08/316,047, filed Sep. 30, 1994, by Kenneth L. Schierbeek et al., entitled MODULAR VARIABLE REFLECTANCE MIRROR ASSEMBLY, now U.S. Pat. No. 5,659,423, the disclosure of which is hereby incorporated herein by reference, two generally rearwardly directed light sensors are mounted, along with a mirror reflectance level control circuit to the back of the reflective element. Hence, the overall weight of the mirror assembly is significantly increased but without a corresponding increase in the stiffness to its supporting structure. This may result in a mirror actuator assembly and reflective element with a lower natural frequency, which subjects the mirror actuator assembly to increased vibration. This increased vibration can induce unwanted distortion in the reflected image in the reflective element and may shorten the service life of the various components subjected to the vibration.

Furthermore, as the number of components and controls increase the amount of available space within the housing to accommodate all these components and controls is becoming increasingly limited. Moreover, since a large number of the components are installed on the back of the mirror actuator assembly, servicing of the mirror actuator assembly is more difficult. Typically each component requires removal in order to access the components within the mirror actuator assembly housing.

Accordingly, there is a need for an exterior mirror assembly that is not as susceptible to vibrations. There is also a need for an exterior mirror assembly that provides more space for the many electrical components and electronic controls that are desirable in today's sophisticated exterior mirror assembly. Moreover, there is a need for a mirror assembly that is easier to assemble and service.

SUMMARY OF THE INVENTION

The present invention provides an improved modular exterior rearview mirror assembly for vehicles incorporating various electronic controls, including, by way of example, instruments, antennas, sensors, and other accessories, into an electronic control module and mounting the electronic control module remotely from the mirror actuator assembly within the rearview mirror assembly to provide more space in the mirror assembly housing, resulting in a rearview mirror assembly with significantly reduced vibration and improved accessibility to the various components in the mirror assembly.

In one aspect, the invention provides a modular exterior rearview mirror assembly for vehicles for mounting on a vehicle, including a case, a reflective element assembly housed in the case and supported by a reflective support means, and an electronic control module mounted in the case independently of the reflective element assembly and the reflective support means. In one aspect of this invention, the reflective element assembly includes an electrical component electrically interconnected with the electronic control module. The electrical component may comprise an electro-optic element, a light sensor module, a heater pad, an ultrasonic transducer, or a mirror actuator assembly. Furthermore, the electronic control module may be supported in a housing. In one aspect, the housing may comprise a molded insert which inserts into the mirror assembly case, a compartment supported on the inner surface of the mirror case, or an enclosure formed by insert molding, potting, or other encapsulating methods. In another aspect, the housing may comprise a compartment supported on the mounting bracket or an enclosure provided on the mounting bracket.

According to another aspect of the invention, a mounting bracket, a case, a reflective element assembly, and an electronic control module are all provided as set forth above. The electronic control module may include an antenna, which may include one of a GPS antenna, a cellular phone antenna, and a garage door opener antenna, and the like.

According to another aspect of the invention, a vehicular exterior rearview mirror assembly includes a reflective mirror element, an electrical component mounted to the reflective element, a body housing the reflective element, and an electronic control module spaced from the reflective mirror and the electrical component and remotely supported by an inner surface of the body. The electronic control module may be supported in a housing supported by the inner surface of the body. Furthermore, the housing may include a sealing member to seal the housing against the inner surface of the body. In other aspects, the electronic control may include an antenna. The electrical component may comprise an electro-optic cell, a light sensor, or a mirror actuator assembly.

According to yet another aspect, the invention includes a case, a reflective element housed in the case, and an electronic control module mounted to the case, wherein the electronic control module includes an antenna. The housing may comprise a modular insert mounted in a wall of the case. Furthermore, the modular insert is adapted to insert into and be supported by an aperture provided in the case and includes an exterior surface which is flush with an exterior surface of the case.

According to yet another aspect of the invention, a cellular phone system is provided which includes an exterior mirror assembly having a reflective element, a case for the reflective element, and a cellular phone system receiver and electrical leads coupled to an antenna positioned within the case. The case may include a housing to support the antenna. Furthermore, the housing may be removable. In one aspect of this invention, the case includes an opening and the housing is supported in the opening. Preferably, the housing includes an exterior surface which is flush with an exterior surface of the case.

Accordingly, the present invention provides a simplified exterior rearview mirror assembly by incorporating a housing member for supporting an electronic control module, preferably carrying some or all the electrical controls for electrical components supported in the mirror assembly, in a position remote from the reflective element assembly within the mirror assembly case, and in a manner that does not add weight to the reflective element assembly, and thus does not contribute directly to the vibration thereof when operated on a highway. The electronic control module housing member may be adapted to releasably support the electronic control module therein. By supporting the electronic control module remote from the reflective element assembly, the frequency response of the reflective element assembly to vibration associated with road travel is reduced. The electronic control module housing can also be molded in different configurations for each specific type of mirror assembly case so as to mount the electronic control module housing on a different inner surface of the mirror case.

This invention makes commercially possible the molding of a one-piece mirror housing which incorporates a support structure for the electronic control module housing in the resinous mirror case to allow quick insertion of an electronic control module. Such one-piece housings are preferably made from polyolefin resins such as polypropylene or polypropylene/polyethylene copolymers having lower heat deflection temperatures, higher material shrinkage rates, and lower cost.

The present invention also provides a cellular phone system incorporated into a modular exterior rearview mirror assembly. By locating the cellular phone system antenna in the mirror assembly the antenna is protected from the elements, such as rain, ice, snow, and spray from the road. Moreover, by supporting the antenna on an inner surface of the case, remote from the reflective element assembly, the antenna will be subjected to less vibration, which is commonly exhibited by the reflective element assembly, and will not increase the weight of the reflective element assembly, which may induce further undesirable vibration. Furthermore, the exterior mirror assembly is a convenient location for connecting the antenna to the cellular phone receiver, which is typically located in the vehicle compartment.

These and other objects, advantages, purposes and features of the invention will become more apparent from a study of the following description taken in conjunction with the drawings.

DESCRIPTION OF THE PREFERRED EMBODIMENTS

Figure 7:
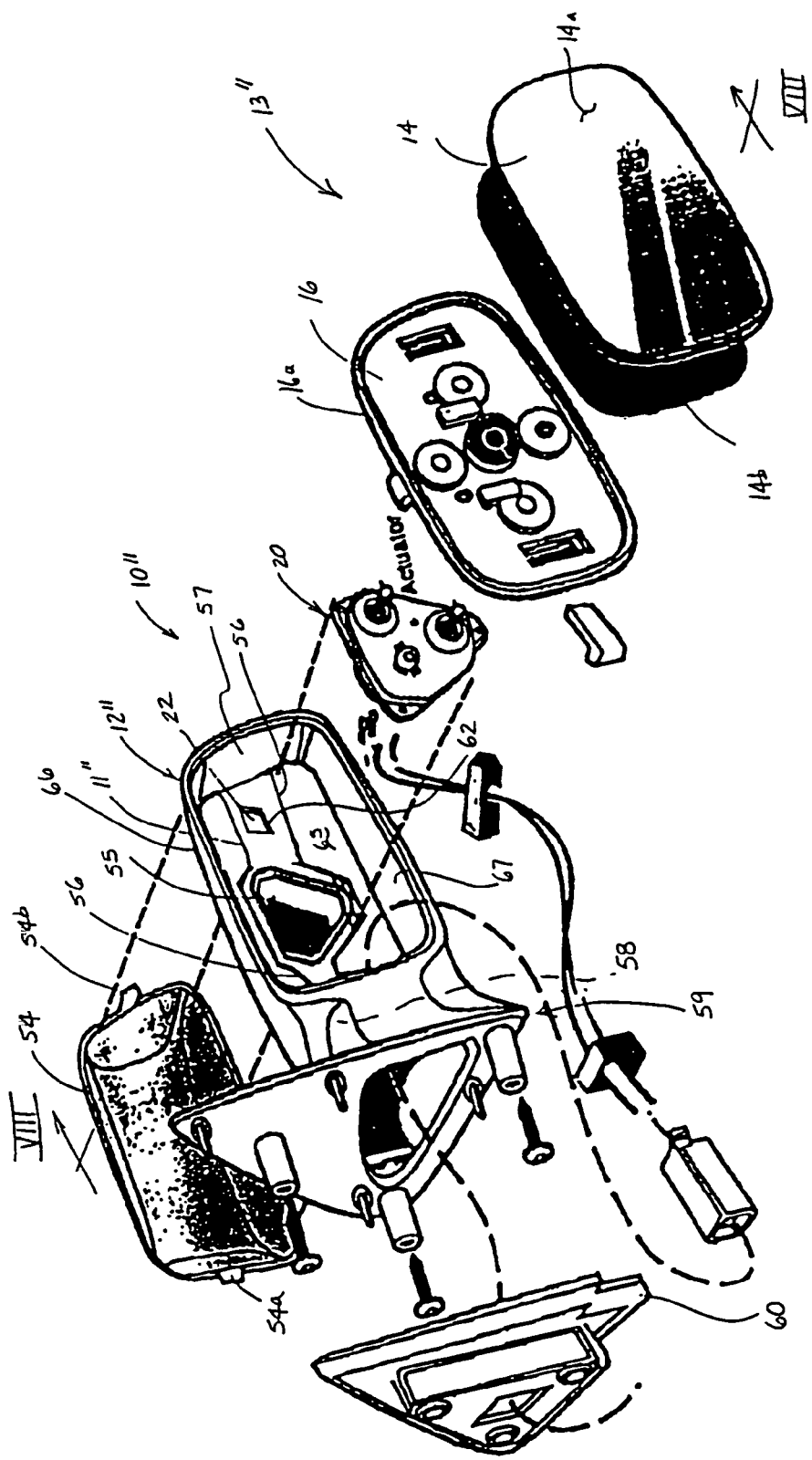
FIG. 7 is an exploded view of a mirror assembly with a back can member, illustrating a third embodiment with the electronic control module supported on a mounting bracket.

Referring now specifically to the drawings and the illustrative embodiments depicted therein, the numeral 10 generally designates a modular exterior rearview mirror assembly of the present invention mounted to a vehicle 8 (FIGS. 1–5). Exterior rearview mirror assembly 10 includes an actuator support member 11 and a molded plastic mirror case 12. Actuator support member 11 may comprise a conventional mounting bracket, which extends through the casing and mounts onto a vehicle panel or may comprise a mounting bracket that is supported by the case of the mirror assembly. Details of the actuator support member 11 and means for attaching the exterior mirror assembly to the vehicle are not provided as they are conventional. Reference, however, is made to FIG. 7 for an example of an actuator support member and vehicle mounting bracket, which is formed on the case and attaches the exterior mirror assembly to a vehicle.

Case 12 houses a reflective element assembly 13. Reflective element assembly 13 includes a reflective mirror element 14 comprising a chrome coated glass member having a glass thickness of approximately 2.2 mm and a backing plate 16 which supports the reflective mirror element 14. Reflective assembly 13 may include a bezel plate or bezel assembly and may include one or more electrical components, such as a heater pad, an electro-optic element, an ultrasonic transducer, a light sensor module for adjusting the level of an electrochromic mirror element, a sensor for automatic headlights, blind spot detection systems, keyless entry systems, and the like. Backing plate 16 is supported by a mirror actuator assembly 20, which is turn is supported on actuator support member 11.

Case 12 also houses an electronic control module 22, which may be supported in a housing 24. Case 12 is generally cup-shaped and, preferably, injection molded from non-electrically conductive, nylon material. More preferably, mirror case 12 is injected molded from resinous ABS plastic, such as that sold under the trademark TERLURAN KR2889®, by BASF Company of Wyandotte, Mich. Alternately, other resinous, melt processable plastics or moldable materials such as glass filled nylon and polypropylene could be used to form case 12. A suitable nylon is 13% glass modified nylon 6:6 sold as ZYTEL 71G13L® by I.E. DuPont de Nemours & Company of Wilmington, Del., or PA123G13BK-47 by Bay Resins Inc. of Millington, Md. A suitable polypropylene is TENITE P6M4Z-007® by Eastman Chemical Products, Inc., Kingsport, Tenn.

Reflective element 14 may comprise a conventional non-electro-optic mirror element including metallic reflector coated glass substrate such as with a thin chromium reflector coating or may include a non-metallic reflector, such as a dichroic such as is described in U.S. Pat. No. 5,207,492 to Roberts et al. or may be a reflector comprising a silicon reflective layer such as is described in U.S. Pat. No. 5,535,056 to Caskey et al. which is herein incorporated by reference. Alternatively, reflective element 14 may comprise a variable reflective electro-optic element such as an electrochromic mirror element and may comprise one of several types of electrochromic elements—the electrochemichromic type, such as that disclosed in U.S. Pat. No. 5,140,455 issued to Varaprasad et al. and commonly assigned with the present application, the disclosure of which is hereby incorporated herein by reference or may be of the solid state type such as that disclosed in the U.S. Pat. No. 4,712,879 issued to Niall R. Lynam et al., U.S. patent application Ser. No. 08/023,675, filed Feb. 22, 1993 by Varaprasad et al., U.S. patent application Ser. No. 08/193,557, filed Feb. 8, 1994 by Varaprasad et al., and U.S. application Ser. No. 08/238,521, filed Mar. 5, 1994 by Varaprasad et al., now U.S. Pat. No. 5,668,663, all commonly assigned with the present application to Donnelly Corporation, the disclosures of which are herein incorporated by reference. Such electrochromic elements comprise an electrically responsive electrochromic medium that modulates reflectivity from a reflective element. Such electrochromic mirror elements are continuously variable and exhibit multiple partial reflectant states as the voltage applied thereto is varied. Alternatively, reflective element 14 may comprise other electro-optic mirror elements, such as a liquid crystal mirror and the like.

An electrochromic mirror element 14 is preferably driven by signals produced by a variable reflectance system of the type disclosed in U.S. patent application Ser. No. 08/316,047, for MODULAR VARIABLE REFLECTANCE MIRROR ASSEMBLY filed Sep. 30, 1994, now U.S. Pat. No. 5,635,281, by Kenneth L. Schierbeek et al., which is herein incorporated by reference.

Actuator assembly 20, which secures reflective mirror element 14 and backing plate 16 to actuator support member 11, is a two-axis positioning device that adjusts the position of the reflective mirror element 14 and the backing plate 16 about vertical and horizontal axes, as is know in the art. In the illustrative embodiment, actuator 20 may be Model No. H16-49-8001 (right hand mirror), Model No. H16-49-8051 (left hand mirror) marketed by Matsuyama of Kawagoe, Japan, or Model No. 540 marketed by Industrie Koot BV (IKU) of Montfoort, Netherlands.

Actuator assembly 20, which may also be a memory actuator of the type disclosed in U.S. Pat. No. 5,196,965 to Lang et al. entitled REARVIEW UNIT FOR MOTOR-VEHICLES, is powered by a vehicle battery voltage, ignition voltage or a 12-volt supply by a power line. Because the mirror assembly is to be used as an exterior mirror, a heater pad may be positioned against reflective mirror element 14 in order to remove ice and dew from mirror element 14. Such heater structure may be of the type disclosed in commonly assigned U.S. patent application Ser. No. 07/971,676, filed Nov. 4, 1992, by Niall R. Lynam et al. for an ELECTROCHROMIC MIRROR FOR VEHICLES, now U.S. Pat. No. 5,446,576, the disclosure which is hereby incorporated by reference. Also, an ultrasonic transducer, such as conventionally known, can be included to remove raindrops from the outer surface 14*a* of the reflective mirror element 14 such as disclosed in U.S. Pat. No. 5,012,593 issued to Shoji Okada et al. for DEVICE FOR REMOVING WATER DROPLETS. Alternatively, the outer surface 14a of the reflective element 14 can be wiped clean of water droplets and general debris by means of an exterior mirror wiper blade (not shown), which is commonly known in the exterior mirror assembly art.

Electronic control module 22 includes an integral carrier member 27, such as a conventional circuit board, for example a PCB, on which one or more electronic devices are installed. In some applications, it may be necessary to treat the electronic control module with a conformal coating, which provides a moisture barrier for the electronic devices and electrical circuitry mounted on the circuit board. Conventional methods of conformal coating include dipping of a circuit board into a conformal agent. In some instances, double dipping may be required. After a first application of the conformal agent is dried, the circuit board is dipped again to provide a second coating to provide further assurances that the circuit board is completely covered with the protective coating.

Figure 5:
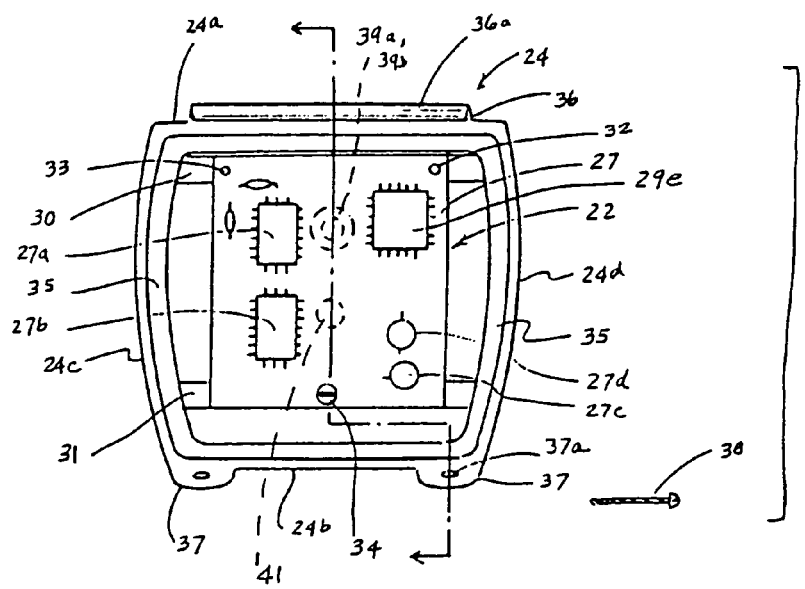
FIG. 5 is a plan view of the electronic control module looking along line V—V of FIG. 3.
Figure 9:
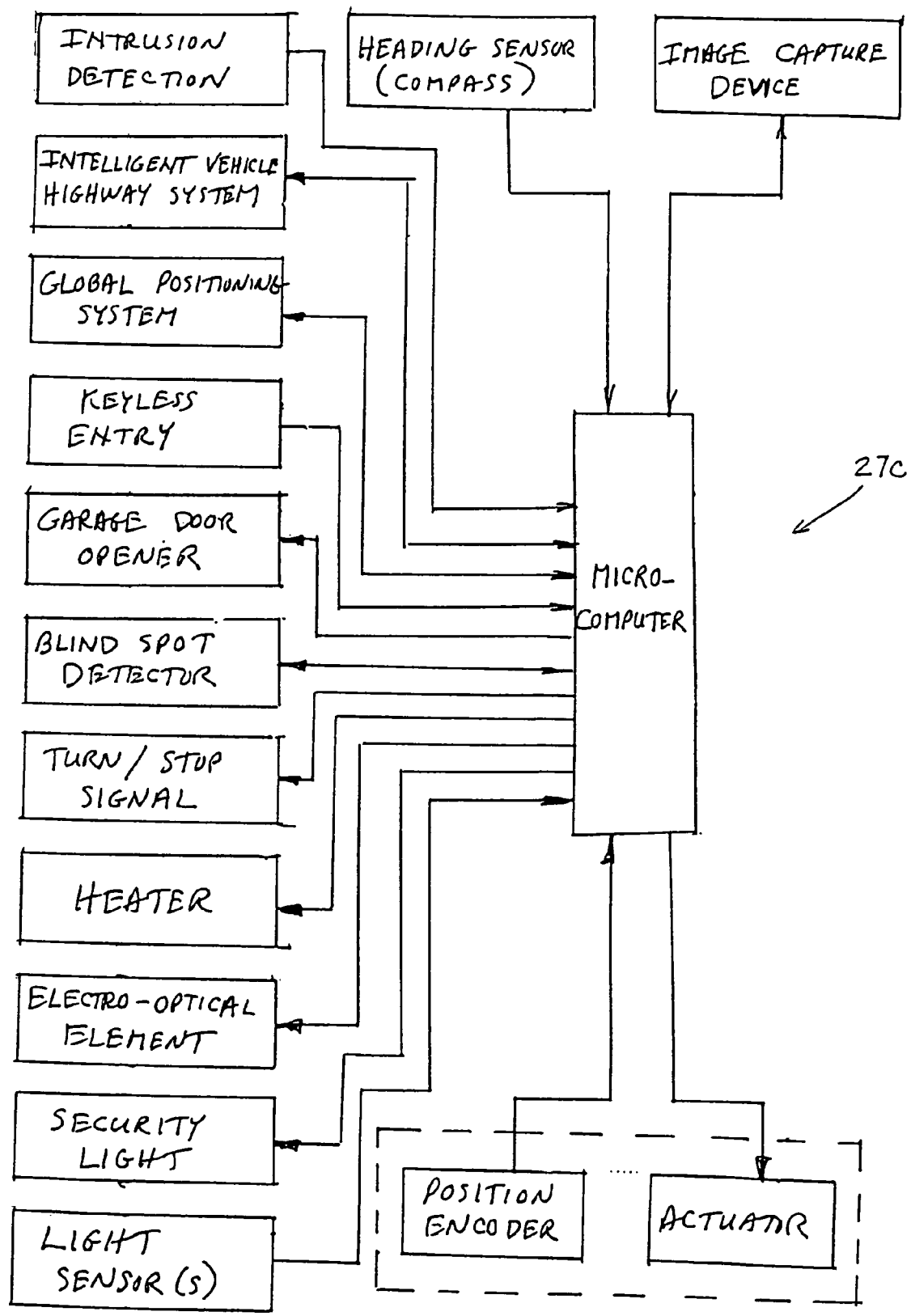
FIG. 9 is a schematic view of the various electrical components and electronic components housed in the mirror assembly of the present invention.

As best illustrated in FIG. 5, electronic control module 22 may include electronic devices including a memory device 27b for storing the positions for a memory mirror actuator assembly or an electronic device 27a, which is functionally interconnected electrically with one or more electrical components either in the mirror assembly case or in the vehicle compartment, such as the mirror actuator assembly 20, a heater pad, sensors for adjusting the reflectance level of an electrochromic mirror element and for automatic headlight activation, electro-optic mirror elements, blind spot detection systems, compass systems, intrusion detection systems, vehicle security lights and turn signal indicators, keyless entry systems, and trainable garage door opener systems. Similarly, the electronic module 22 may include an electrical distribution network 27c, such as disclosed in co-pending application, entitled VEHICLE MIRROR DIGITAL NETWORK AND DYNAMICALLY INTERACTIVE MIRROR SYSTEM Ser. No. 08/679,681, filed on Jul. 11, 1996, now U.S. Pat. No. 5,798,575, which is incorporated by reference herein. As shown in FIG. 9, the network 27c may include all the previously described electronic devices. But it should be understood that FIG. 9 is for illustrative purposes only and that network 27c may include only one of the electronic devices. Furthermore, these devices may be individually supported on the module 122. Electronic control module 22 may similarly support an antenna 27d for a cellular phone system, a Global Positioning System (GPS), a garage door opener, including an electronically trainable garage door opener disclosed in U.S. Pat. No. 5,479,155 issued to Zeinstra et al., or the like. In the case of the cellular phone system, antenna 27d is coupled through a lead 39b that extends through the mirror assembly case into the compartment of the vehicle to the cellular phone system receiver 29. Moreover, the electronic control module 22 may support an GPS system 29e, including a GPS receiver, which would communicate to the GPS satellites through the GPS antenna, also supported on the electronic control module 22.

Figure 1:
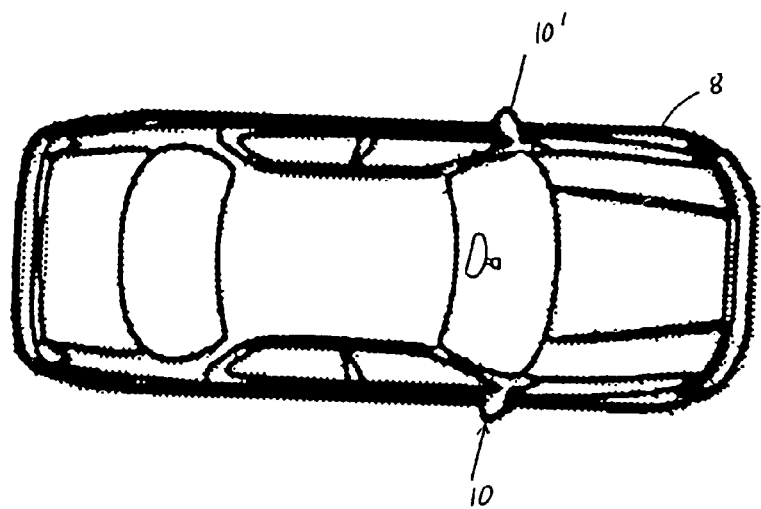
FIG. 1 is a top plan view of a vehicle incorporating an exterior modular rearview mirror assembly of the present invention.
Figure 2:
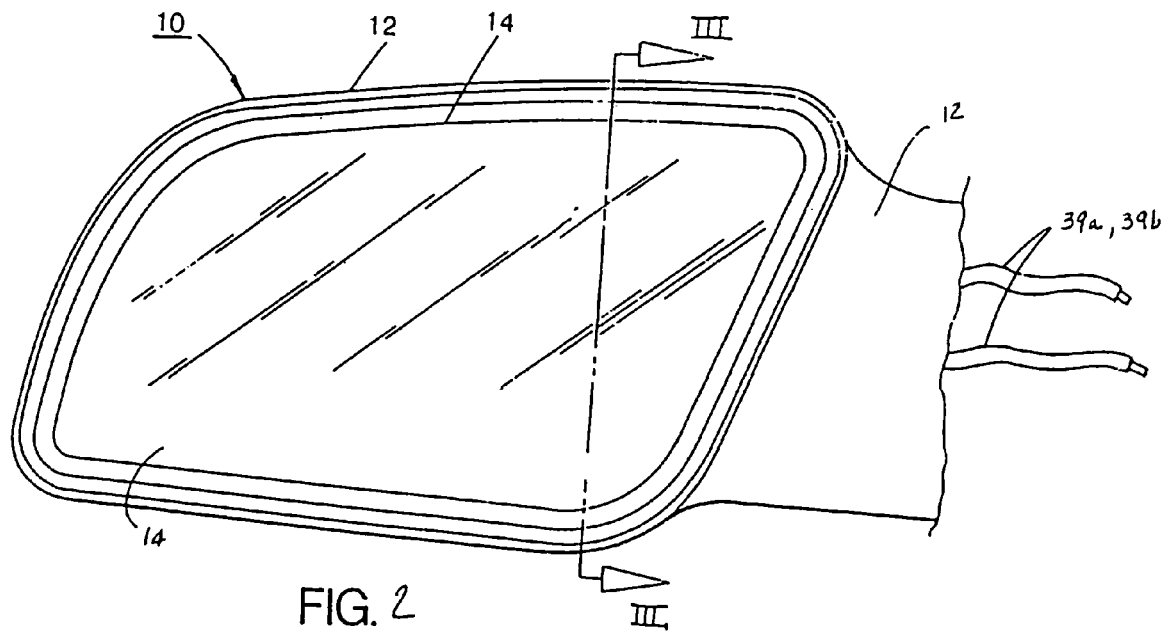
FIG. 2 is a rear elevational view of the exterior modular rearview mirror assembly of FIG. 1.
Figure 3:
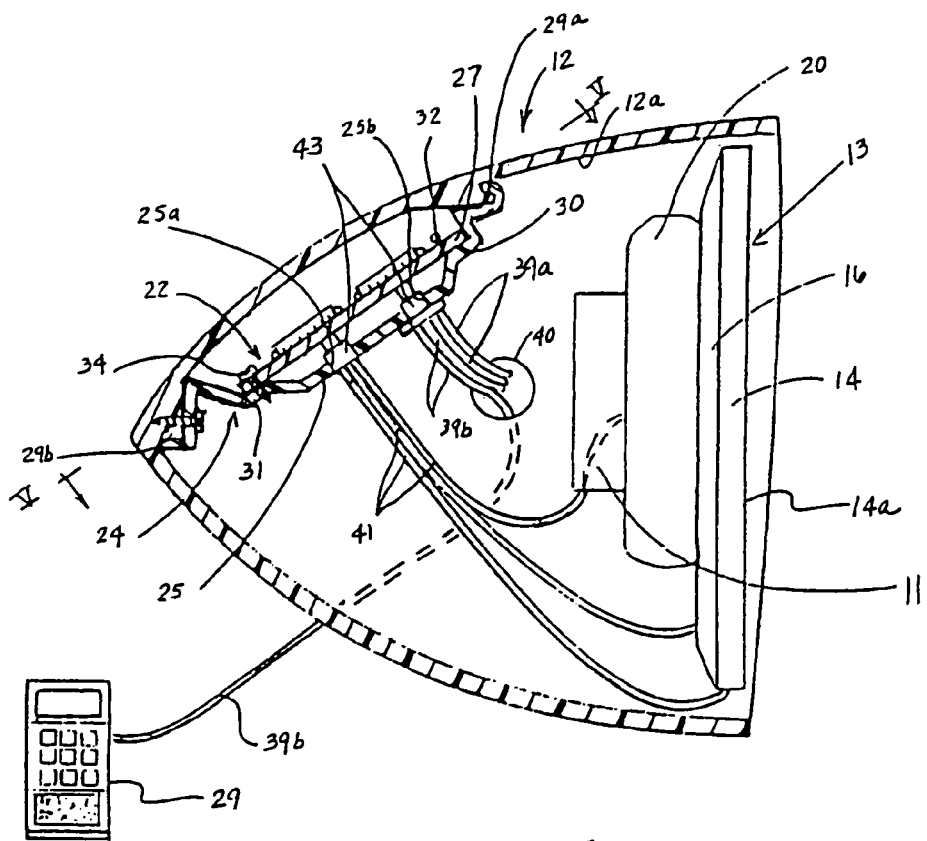
FIG. 3 is a sectional view taken along line III—III of FIG. 2, illustrating the electronic control module housing supported in the mirror assembly.
Figure 4:
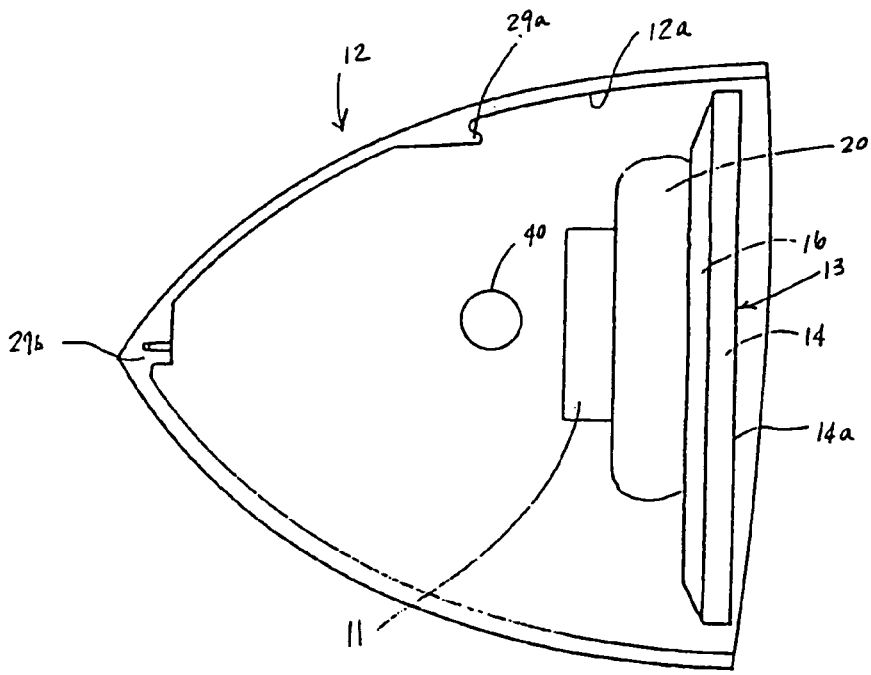
FIG. 4 is the same view as FIG. 3, illustrating the support structures provided on the mirror assembly case for supporting an electronic control module housing, with the electronic control module removed for clarity.

As best seen in FIG. 3, electronic control module 22 may be supported by the electronic control module housing/cover. The housing comprises a compartment 24, which is preferably injection molded from non-electrically conductive, nylon material. More preferably, compartment 24 is injected molded from resinous ABS plastic, such as TERLURAN KR2889®. Alternately, compartment 24 may comprise other resinous, melt processible plastics or moldable materials such as glass filled nylon and polypropylene. A suitable nylon is 13% glass modified nylon 6:6 sold as ZYTEL 71G13L® or PA123G13BK-47. A suitable polypropylene is TENITE P6M4Z-007. In order to support compartment 24 in case 12, case 12 includes support structure, such as the hook catch 29a and threaded boss 29b shown in FIGS. 3 and 4. Compartment 24 is generally rectangular in shape having a base wall 25 with an upper edge 24a, a lower edge 24b, and opposed side edges 24c and 24d. Extending between side edges 24c and 24d on base wall 25 are shoulders 30 and 31 that provide flat mounting surfaces and bearing support for electronic control module 22. Shoulder 30 includes integrally formed projecting pins 32 for engaging corresponding openings 33 formed on one end portion of integral carrier member 27. The other end portion of carrier member 27 is anchored to shoulder 31 by a fastener 34, preferably a self tapping screw or other suitable releasable fasteners. In order to reduce vibration of compartment 24 and to prevent moisture and debris from entering compartment 24, a sealing surface 35 is provide around the perimeter of the compartment 24. Sealing surface 35 engages and seals against inner surface 12a of case 12. As best seen in FIG. 5, compartment 24 includes a flange 36 with a hook shaped edge 36a for engaging hook catch 29a of case 12 and a pair of screw flanges 37 with fastener holes 37a extending therethrough for receiving fasteners 38, which extend through screw flanges 37 and into threaded bosses 29b. It should be understood that other similar structures may be used for releasably anchoring the compartment 24 in the case 12, such as snap fit, screw type, or other releasable fasteners.

The electronic devices on electronic control module 22 are powered through externally extending power leads 39a that couple to a vehicle wiring bus, such as powered by an ignition switch or a 12-volt battery (not shown). As best shown in FIG. 3, power leads 39a extend from electronic control module 22 through compartment 24 and through an opening 40 provided in case 12. Electronic control module 22 further includes leads 39b and 41 for coupling the electronic controls to the various electrical components that are inside and outside the case 12. As shown, leads 41 extend through electronic control module compartment 24 to reflective element 14, mirror actuator assembly 20, and other electrical components 42a, such as a light sensor module for the variable reflectance control system, a heater pad, sensors for adjusting the reflectance level of an electrochromic mirror element and for automatic headlights, electro-optic mirror elements, blind spot detection systems, compass systems, intrusion detection systems, vehicle security lights and turn signal indicators, keyless entry systems, and trainable garage door opener systems. Leads 39b extend through opening 40 to couple to various electrical components that may be outside the exterior mirror assembly, such as a cellular phone receiver 29, automatic headlight systems, security systems, GPS systems, IVHS systems, light indicator systems, and the like. It should be understood, that a GPS system, a security system, and a light indicator system may also be housed in the mirror assembly case.

To provide interconnection with electronic control module 22, compartment base wall 25 includes at least one opening through which electrical leads extend to connect to the electronic control module 22. Preferably, base wall 25 includes a pair of openings 25a and 25b, one for the electrical leads 39a and 39b that extend through opening 40 in case 12 for external connections and the other for the electrical leads 41 that couple the module 22 to the various electrical components in the mirror assembly case. Holes 25a and 25b each may include a grommet 43 to seal the electronic control module compartment and to protect the leads 39a, 39b, and 41 from damage that may result from rubbing against the edge of openings 25*a* and 25*b*. Grommets 43 are conventional and typically comprise a generally elastomeric material, such as EPDM, rubber, or silicone. Alternatively, holes 25*a* and 25*b* may support connectors through which leads 39*a*, 39*b*, and 41 electrically couple to the electronic control module 22.

Figure 6:
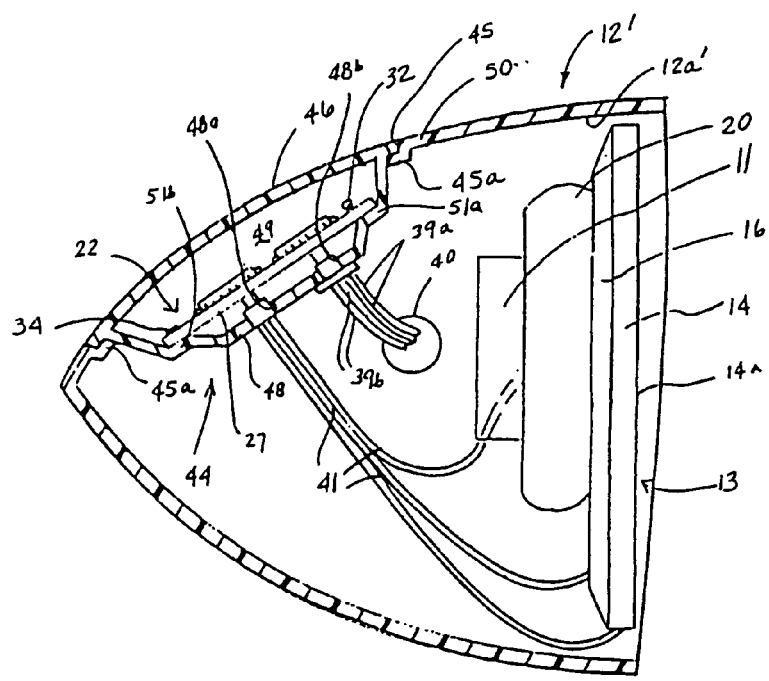
FIG. 6 is the same view as FIG. 3 illustrating a second embodiment of the electronic control module housing supported in an opening formed in the mirror assembly case.

Referring to FIG. 6, a second preferred embodiment of an electronic control module housing comprises an integrally molded insert 44 that is adapted to be inserted into an opening 45 provided in mirror assembly case 12'. Insert 44 includes an outer wall 46 and an inner wall 48, which define an enclosure 49 therebetween, and is supported on shoulders 45*a* provided on the inner surface 12*a'* of case 12' adjacent opening 45. Insert 44 is inserted into and supported in opening 45 such that outer wall 46 is aligned flush with the wall 50 of case 12' and, therefore, becomes a part of the mirror assembly case 12'. Inner wall 48 supports electronic control module 22 in enclosure 49 on a pair of shoulders 51*a* and 51*b*, which provide flat mounting surfaces and bearing support for module 22. Module 22 may be secured to inner wall 48 in the same manner as described in reference to the previous embodiment. Module 22 includes electrical leads 39*a* for coupling the electronic control module 22 to the power supply, leads 39*b* for coupling to various electrical components outside the mirror assembly, such as the cellular phone system receiver or the automatic headlight system or the like, and leads 41 for coupling to the various electrical components inside the mirror assembly case 12'. Similarly to the first embodiment, inner wall 48 includes apertures 48*a* and 48*b* to accommodate leads 39*a* and 39*b* and 41, which extend through inner wall 48 to electronic control module 22.

In this preferred embodiment, a pre-assembled electronic control module and electronic control module housing is disclosed in the form of an insertable modular unit. The insertable modular unit reduces the number of installation steps by incorporating the electronic control module into the housing. Moreover, the modular unit is simple to remove for service or replacement.

In another preferred embodiment, shown in FIG. 7, the mirror assembly 10" includes a back can member, shell, or outer wall 54. In this embodiment, the mirror assembly 10" includes a case 12" housing and supporting mirror actuator assembly 20 on actuator support member 11", which in turn supports a reflective element assembly 13". Reflective element assembly 13" includes reflective element 14 and backing plate 16 and may include a bezel plate or bezel assembly (not shown) and may include one or more electrical components, such as a heater pad, an electro-optic element, an ultrasonic transducer, a light sensor module for adjusting the level of an electrochromic mirror element, a sensor for automatic headlights, blind spot detection systems, keyless entry systems, and the like. Reflective element 14 may be mounted on backing plate 16 by an adhesive layer 14*b* and further supported on backing plate 16 by a lip 16*a*, which extends outwardly from the perimeter of backing plate 16 and surrounds and holds reflective element 14. Actuator support member 11" includes a central support member 55 for actuator assembly 20 and a pair of arms 56 that extend from central support member 55 to side walls 57 and 58 of the case 12". Case 12" includes a base 59 for mounting the mirror assembly 10" to a vehicle mounting bracket 60. Back can member 54 includes a pair of tabs 54*a* and 54*b* which snap onto receiving structures on the side walls 57 and 58 of the case 12". Preferably, back can 54 is preferably nylon. More preferably, back can 54 is injection molded from resinous ABS plastic, such as TERLURAN KR2889. Alternately, back can 54 may comprise other resinous, melt processible plastics or moldable materials such as glass filled nylon and polypropylene. A suitable nylon is 13% glass modified nylon 6:6 sold as ZYTEL 71G13L or PA123G13BK-47. A suitable polypropylene is TENITE P6M4Z-007. Back can 54 snaps on to the mirror assembly case 12" to establish the color or texture of the mirror assembly case 12" 50 that it matches the vehicle on which it is to be mounted.

In this embodiment, electronic control module 22 is supported on actuator support member 11" independently of the reflective element 14 and the mirror actuator assembly 20. Preferably, actuator support member 11" includes a receptacle for supporting and providing an enclosure 62 for electronic control module 22. Furthermore, the electronic control module 22 may be injection molded with the actuator support member 11" to provide an encapsulation of the electronic control module 22 in the actuator support member 11".

Figure 8:
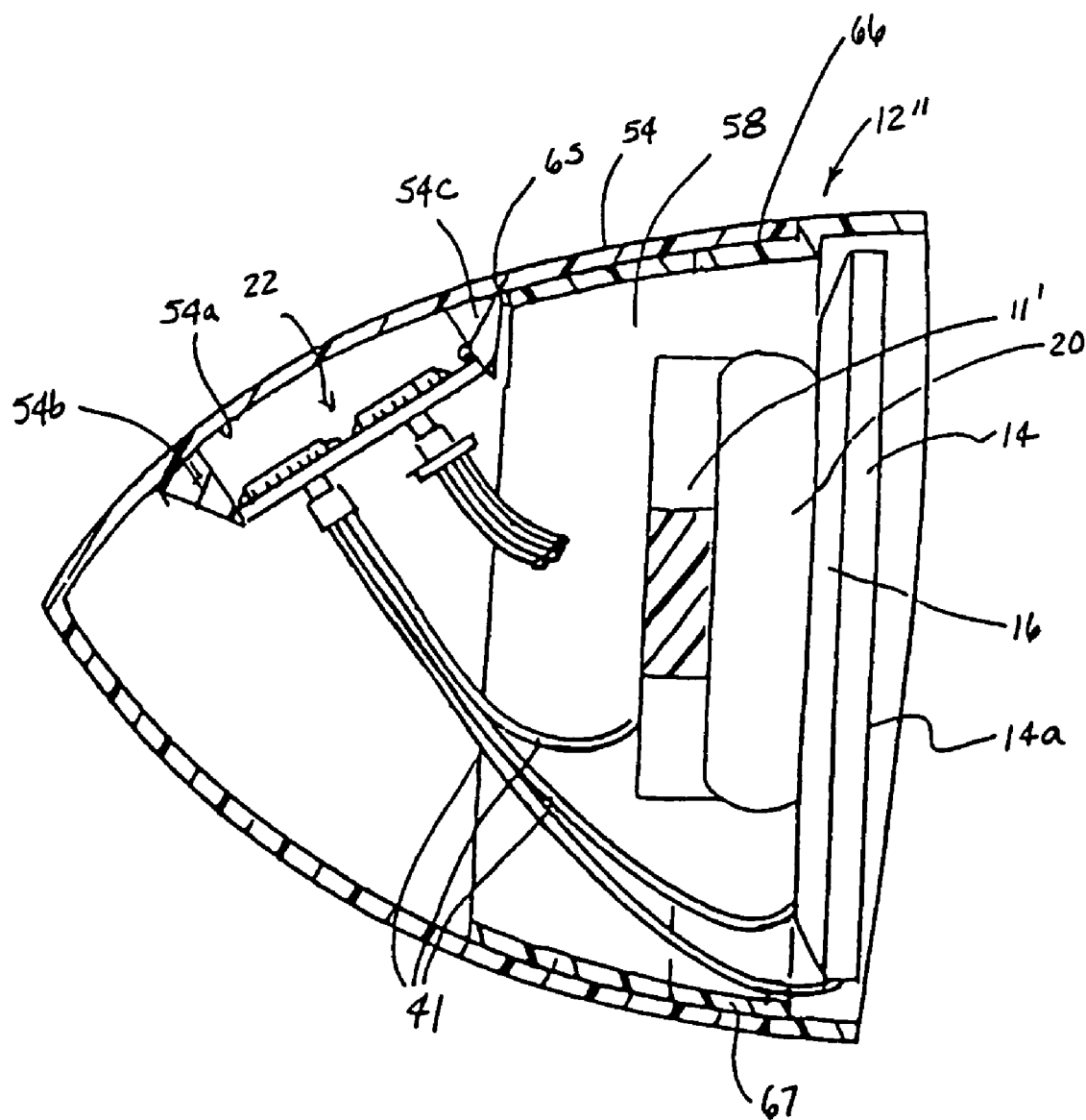
FIG. 8 is sectional view taken along line XIII—XIII of FIG. 7 illustrating a fourth embodiment with the electronic control module housing supported on an inner surface of the back can.

In yet another embodiment, electronic control module 22 is supported on back can 54. As best seen in FIG. 8, electronic control module 22 is supported on inner surface 54*a* of the back can 54 between shoulders 54*b* and 54*c*. Electrical interconnection with the electronic control module 22 is made through an opening 65 defined by the perimeter of the side walls 57 and 58 and top and bottom walls 66 and 67 of casing 12". As with the previously described embodiments, the installation process is greatly simplified. The service or replacement of the electronic control module 22 is even further improved.

Mounting the electronic control module 22 remotely from the reflective element assembly serves several functions. By removing the weight of the electronic devices from the reflective element assembly and redistributing their weight to the case, or in the case of the third embodiment onto a rigid actuator support member, the vibration in the mirror actuator assembly is significantly reduced. Vibration can cause undesirable distortion in the reflected image. Vibration may also shorten the operational life of the several components in the mirror assembly housing that are subjected to the vibration. In addition, by removing some or all the electronic controls from the reflective element assembly the inherent space limitations are improved, possibly creating sufficient space for other components that were previously omitted. Furthermore, the improved but still limited space may make the other components more accessible for service or replacement. The mirror assembly is also easier to assemble—the electronic control module housing, which supports a plurality of electronic controls, is simply inserted into case 12 or 12'. In the third embodiment, the electronic control module is simply inserted in to the back can of the mirror assembly case 12".

While several forms of the invention have been shown and described, other forms will now be apparent to those skilled in the art. For instance, the electronic control module may be a potted module, thereby forming a protective housing around the electronic control module, which may attach to the mirror assembly case. Moreover, the electronic control module may be insert molded with the mirror assembly case or encapsulated in the wall of the case, in which the case provides the housing for the electronics module. Also, while illustrated herein for application to an exterior rearview mirror assembly, the concept of this invention can also be beneficially applied to an interior rearview The embodiments of the invention in which an exclusive property or privilege is claimed are as follows:

1. A cellular phone system comprising:
   a mirror assembly including a mirror case and a reflective element housed in said case, said case being substantially electrically non-conducting; and
   a cellular phone system receiver including a transmitting and receiving antenna, said antenna having a weight, said cellular phone system receiver adapted to receive signals and transmit signals with said antenna, said antenna being positioned within said mirror case and supported within the mirror assembly by a mirror case structure in a manner such that said weight of said antenna is not directly carried by said reflective element and does not directly impact the vibration performance of said reflective element.

2. A cellular phone system according to claim 1, wherein said mirror case further supports a modular housing, said antenna positioned within said modular housing.

3. A cellular phone system according to claim 2, further comprising an electronic control module supported in said modular housing, said antenna mounted on said electronic control module in said modular housing.

4. A cellular phone system according to claim 3, wherein said cellular phone system receiver is mounted on said electronic control module.

5. A cellular phone system according to claim 2, wherein said antenna is integrally formed with said mirror case.

6. A cellular phone system according to claim 1, wherein said antenna is removable from said mirror case for service or replacement.

7. A cellular phone system comprising:
   an exterior mirror assembly including a case;
   a reflective element support in said case; and
   a cellular phone system receiver including a transmitting and receiving antenna and electrical leads coupled to said antenna, said antenna having a weight, said cellular phone system receiver adapted to receive signals with said transmitting and receiving antenna and to convert said signal into audio signals, said receiving antenna positioned within said case and being mounted to a mirror case structure of said mirror case independent of said reflective element wherein said weight of said antenna is carried by said mirror case structure and not directly carried by said reflective element and does not directly impact the vibration performance of said reflective element.

8. A cellular phone system according to claim 7, said case including a housing for supporting said antenna within said case.

9. A cellular phone system according to claim 8, wherein said housing is removably attached to said case whereby said antenna can be removed for service or replacement.

10. A cellular phone system according to claim 7, wherein said case includes an opening, said antenna in a modular housing inserted and supported in said opening of said case.

11. A cellular phone system according to claim 10, wherein said modular housing includes an exterior surface and said case includes an exterior surface, said housing mounted in said opening to align said exterior surface of said housing flush with said exterior surface of said case.

12. A cellular phone system comprising:
    an exterior mirror assembly including a case;
    a reflective element support in said case; and
    a cellular phone system receiver including a transmitting and receiving antenna and electrical leads coupled to said antenna, said cellular phone system receiver adapted to receive signals with said transmitting and receiving antenna and to convert said signal into audio signals, said receiving antenna positioned within said case, wherein said case includes a first case wall and a second case wall, said first case wall including an opening formed therein, said second case wall overlaying said first case wall and defining an outer surface of said case, said antenna supported on said second case wall and extending into said opening of said first case wall wherein said antenna is supported within said case in a manner such that said weight of said antenna is not directly carried by said reflective element and does not directly impact the vibration performance of said reflective element.

13. A cellular phone system according to claim 12, wherein said antenna is supported on an electronic control module, said electronic control module positioned in said opening of said first case wall.

14. A cellular phone system comprising:
    a mirror assembly including a mirror case, a reflective element, and an actuator supporting said reflective element, said mirror case including a case wall defining a cavity, said actuator supporting said reflective element in said cavity formed by said case wall, said actuator permitting adjustment of an orientation of said reflective element in said case, said actuator and said reflective element defining an actuator supported reflective element assembly; and
    a cellular phone system receiver including an antenna, said cellular phone system receiver adapted to receive signals and transmit signals with said antenna, said antenna supported by said case wall of said mirror case, said antenna having an inherent weight, said inherent weight of said antenna being distributed to said wall of said mirror case and not to said actuator supported reflective element assembly to thereby reduce vibration of said reflective element.

15. The cellular phone system according to claim 14, further comprising a modular housing, said antenna positioned within said modular housing.

16. The cellular phone system according to claim 14, further comprising an electronic control module, said antenna mounted on said electronic control module in said mirror case.

17. The cellular phone system according to claim 16, wherein said receiver is mounted to said electronic control module.

18. The cellular phone system according to claim 16, further comprising a housing, said electronic control module being supported in said housing.

19. The cellular phone system according to claim 18, wherein said housing comprises a modular insert mounted in said wall of said case.

20. The cellular phone system according to claim 19, wherein said wall of said case includes an opening receiving said modular insert.

21. The cellular phone system according to claim 16, wherein said electronic control module communicates with at least one electrical component supported in said mirror assembly.

22. The cellular phone system according to claim 21, wherein said electrical component is supported by said reflective element.

23. The cellular phone system according to claim 14, wherein said mirror case wall includes a removable back can member, said antenna supported by said back can member.

24. A cellular phone system comprising:
- a mirror assembly including a mirror case, a reflective element, and an actuator supporting said reflective element in said mirror case, said actuator permitting adjustment of an orientation of said reflective element in said case, said actuator and said reflective element defining an actuator supported reflective element assembly;
- a cellular phone system receiver including an antenna, said cellular phone system receiver adapted to receive signals and transmit signals with said antenna, said antenna supported by a wall of said mirror case, said antenna having an inherent weight, said inherent weight of said antenna being distributed to said wall of said mirror case and not to said actuator supported reflective element assembly to thereby reduce vibration of said reflective element; and
- an electrical component housed in said mirror case, said electrical component selected from the group consisting of a heater pad, an ultrasonic transducer for detecting raindrops, a light sensor, an electro-optic mirror element, a blind spot detection system, a compass system, an intrusion detection system, a vehicle security light, a turn signal indicator, a keyless entry system, and a trainable garage door opener system.

25. The cellular phone system according to claim 24, wherein said electrical component and said antenna are mounted on an electronic control module.

26. A cellular phone system comprising:
- a mirror assembly including a mirror case, a reflective element, and an actuator, said mirror case including a cavity, said actuator supporting said reflective element in said cavity, said actuator permitting adjustment of an orientation of said reflective element in said case, and said actuator and said reflective element defining an actuator supported reflective element assembly; and
- a cellular phone system receiver including an antenna, said cellular phone system receiver adapted to receive signals and transmit signals with said antenna, said antenna having an inherent weight and being supported in said cavity by a mirror case structure independent and spaced from said actuator supported reflective element assembly, said weight of said antenna being distributed to said mirror case by said mirror case structure and not to said actuator supported reflective element assembly to thereby reduce vibration of said reflective element.

27. The cellular phone system according to claim 26, further comprising an actuator support member, said actuator support member supporting said actuator in said cavity.

28. The cellular phone system according to claim 27, wherein said antenna is spaced from and independent from said actuator support member.

29. The cellular phone system according to claim 26, further comprising an antenna housing, said antenna housing supporting said antenna and being mounted to said mirror case structure.

30. The cellular phone system according to claim 29, further comprising an electronic module, said antenna being supported on said electronic module in said antenna housing.

* * * * *

UNITED STATES PATENT AND TRADEMARK OFFICE
CERTIFICATE OF CORRECTION

PATENT NO. : 7,035,678 B2  Page 1 of 1
APPLICATION NO. : 09/835661
DATED : April 25, 2006
INVENTOR(S) : Niall R. Lynam, Desmond J. O'Farrell and Roger L. Veldman It is certified that error appears in the above-identified patent and that said Letters Patent is hereby corrected as shown below:

Column 1:
Line 8, "REAR VIEW" should be --REARVIEW--.
Line 13, "REAR VIEW" should be --REARVIEW--.
Line 39, "REAR VIEW" should be --REARVIEW--.

Column 10:
Line 2, Insert --®-- after "KR2889".
Line 6, Insert --®-- after "71G13L".
Line 10, "50" should be --so--.

Signed and Sealed this

Sixteenth Day of January, 2007

JON W. DUDAS
*Director of the United States Patent and Trademark Office*